United States Patent
Agarwal et al.

(10) Patent No.: US 10,484,537 B2
(45) Date of Patent: Nov. 19, 2019

(54) SYSTEMS AND METHODS FOR NETWORKING ACROSS WEB BASED AND TELECOMMUNICATION BASED PORTALS

(75) Inventors: Sheetal Agarwal, Maharashtra (IN); Koustuv Dasgupta, New Delhi (IN); Arun Kumar, Noida (IN); Amit A. Nanavati, New Delhi (IN); Nitendra Rajput, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1012 days.

(21) Appl. No.: 12/608,118

(22) Filed: Oct. 29, 2009

(65) Prior Publication Data

US 2011/0106884 A1 May 5, 2011

(51) Int. Cl.
H04L 29/06 (2006.01)
H04M 3/493 (2006.01)
H04M 7/00 (2006.01)

(52) U.S. Cl.
CPC ........ *H04M 3/4938* (2013.01); *H04M 7/0042* (2013.01); *H04M 2203/4527* (2013.01); *H04M 2203/655* (2013.01)

(58) Field of Classification Search
CPC ............. H04M 3/42042; H04M 1/575; H04M 1/27455; H04M 1/57; H04L 29/08108; H04W 4/02
USPC ........................................................ 709/204
See application file for complete search history.

(56) References Cited

U.S. PATENT DOCUMENTS

| | | | |
|---|---|---|---|
| 2005/0038876 A1* | 2/2005 | Chaudhuri | G06F 17/3087 709/219 |
| 2007/0220092 A1 | 9/2007 | Heitzeberg et al. | |
| 2007/0280445 A1* | 12/2007 | Shkedi | 379/93.23 |
| 2011/0059730 A1* | 3/2011 | Scriven et al. | 455/414.1 |

FOREIGN PATENT DOCUMENTS

WO 2008-084207 7/2008

OTHER PUBLICATIONS

"MobiChange: Using Mobile Social Networking for Enabling Social Change", www.netsquared.org/projects/mobichange-using-mobile-social-networking-enabling-social-change.
"Social Networks Gain "Voice" Through SinVox", www.telephonyworld.com/products/social-networks-gain-voice-through-spinvox/.
"Use Voice to Access Web Email, Calendar, Contacts, and Social Networks During a Phone Call with toktok", www.earthtimes.org/articles/show/use-voice-to-access-web.735634.shtml.
(Continued)

*Primary Examiner* — Adnan M Mirza
(74) *Attorney, Agent, or Firm* — Ference & Associates LLC (57) ABSTRACT

Embodiments of the invention provide a non-web based social networking system enabling users having limited Internet connectivity and/or limited access to high end mobile computing devices a cross networking opportunity with web-based social networking sites. Embodiments of the invention provide for additional communication modalities between social networking users, including but not limited to non-web based communication between the social networking users.

12 Claims, 5 Drawing Sheets

(56) References Cited

OTHER PUBLICATIONS

Kurkovsky, Stan, et al., "Mobile Voice Access in Social Networking Systems", Fifth International Conference on Information Technology: New Generations, Apr. 7-9, 2008, pp. 982-987, Las Vegas, Nevada, USA, IEEE, New York, New York, USA.
International Search Report of PCT/EP2010/065850, European Patent Office. Rijswijk NL, dated Jan. 20, 2011 (3 pages).

* cited by examiner

SYSTEMS AND METHODS FOR NETWORKING ACROSS WEB BASED AND TELECOMMUNICATION BASED PORTALS

BACKGROUND

Web based social networking sites such as FACEBOOK, ORKUT and TWITTER are quite popular. Users can connect, interact and communicate with one another using their social networking profiles. Web based social networking sites enable users to communicate in a variety of ways, including email exchanges, posting of text-based messages to one another's profiles, and even sending short SMS messages to one another's mobile devices via the social networking web site. Web based social networking sites, however, presume users have sufficiently high-end, web-enabled electronic devices (for example, laptop computers, desktop computers, mobile computing devices, smart phones and the like) as well as access to the Internet.

BRIEF SUMMARY

Embodiments of the invention broadly contemplate systems, methods, apparatuses and program storage devices providing a bridge between web-based portals and non-web based portals (for example, telecommunication-based portals) that enable users of each to cross-network. Embodiments of the invention enable web-based social networking site users to interact through one or more non-web based modalities, for example a voice based modality. Embodiments of the invention additionally enable new population segments of users, for example telecommunication users, to interact with web-based social networking sites and users thereof via a non-web based modality (for example, a voice-based modality) without requiring Internet access or use of high-end electronic/computing devices. Accordingly, embodiments of the invention enable web-based social networking site users and non-web based social networking site users to cross-network with one another.

In summary, one aspect of the invention provides an apparatus comprising: one or more processors; and a computer readable storage medium having computer readable code embodied therewith and executable by the one or more processors, the computes readable program code comprising: computer readable program code configured to provide one or more telecommunication users a non-web based connection to a non-web based portal having one or more voice sites; computer readable program code configured to place the non-web based portal in operative communication with one or more web-based portals having one or more web sites; and computes readable program code configured to permit the one or more telecommunication users and one or more web users of the one or more web-based portals to communicate via the non-web based portal.

Another aspect of the invention provides a method comprising: utilizing one or more processors to execute a program of instructions tangibly embodied on a computer readable storage medium, the program of instructions comprising computer readable program code configured to provide one or more telecommunication users a non-web based connection to a non-web based portal having one or more voice sites; computer readable program code configured to place the non-web based portal in operative communication with one or more web-based portals having one or more web sites; and computer readable program code configured to permit the one or more telecommunication users and one or more web users of the one or more web-based portals to communicate via the non-web based portal.

A further aspect of the invention provides a computer program product comprising: a computer readable storage medium having computer readable program code embodied therewith, the computer readable program code comprising: computer readable program code configured to provide one or more telecommunication users a non-web based connection to a non-web based portal having one or more voice sites; computer readable program code configured to place the non-web based portal in operative communication with one or more web-based portals having one or more web sites; and computer readable program code configured to permit the one or more telecommunication users and one or more web users of the one or more web-based portals to communicate via the non-web based portal.

A still further aspect of the invention provides an apparatus comprising: one or more processors; and a computer readable storage medium having computer readable code embodied therewith and executable by the one or more processors, the computer readable program code comprising: computer readable program code configured to place a web-based portal in operative communication with a non-web based portal having one or more voice sites; and computer readable program code configured to permit one or more web users of the web portal to communicate with telecommunication users associated with the one or more voice sites.

A further aspect of the invention provides a computer program product comprising: a computer readable storage medium having computer readable program code embodied therewith, the computer readable program code comprising: computer readable program code configured to provide a non-web based portal hosting a plurality of non-web based social networking sites associated with a plurality of telecommunication users; wherein the plurality of non-web based social networking sites are configured to be navigable by the plurality of telecommunication users with non-web-enabled phones; computer readable program code configured to provide one or more communication links between the non-web based portal and a web portal having a plurality of web-based social networking sites associated with a plurality of web users; and computer readable program code configured to pass communications between the plurality of telecommunication users and the plurality of web users utilizing the one or more communication links.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the Figures herein, may be arranged and designed in a wide variety of different configurations in addition to the described exemplary embodiments. Thus, the following more detailed description of the embodiments of the invention, as represented in the Figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

According to an embodiment of the invention, a non-web based portal provides users with standard (non-web/Internet enabled) phones access to a non-web based social networking system. According to an exemplary embodiment of the invention, the non-web based portal connects with one or more web-based portals hosting web-based social networking systems. Thus, embodiments of the invention enable users previously unable to access the Internet, for example telecommunication users having standard phones, the ability to cross network with web-based social networking site users.

The illustrated embodiments of the invention will be best understood by reference to the Figures. The following description is intended only by way of example and simply illustrates certain selected exemplary embodiments of the invention as claimed herein.

The flowchart and block diagrams in the Figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
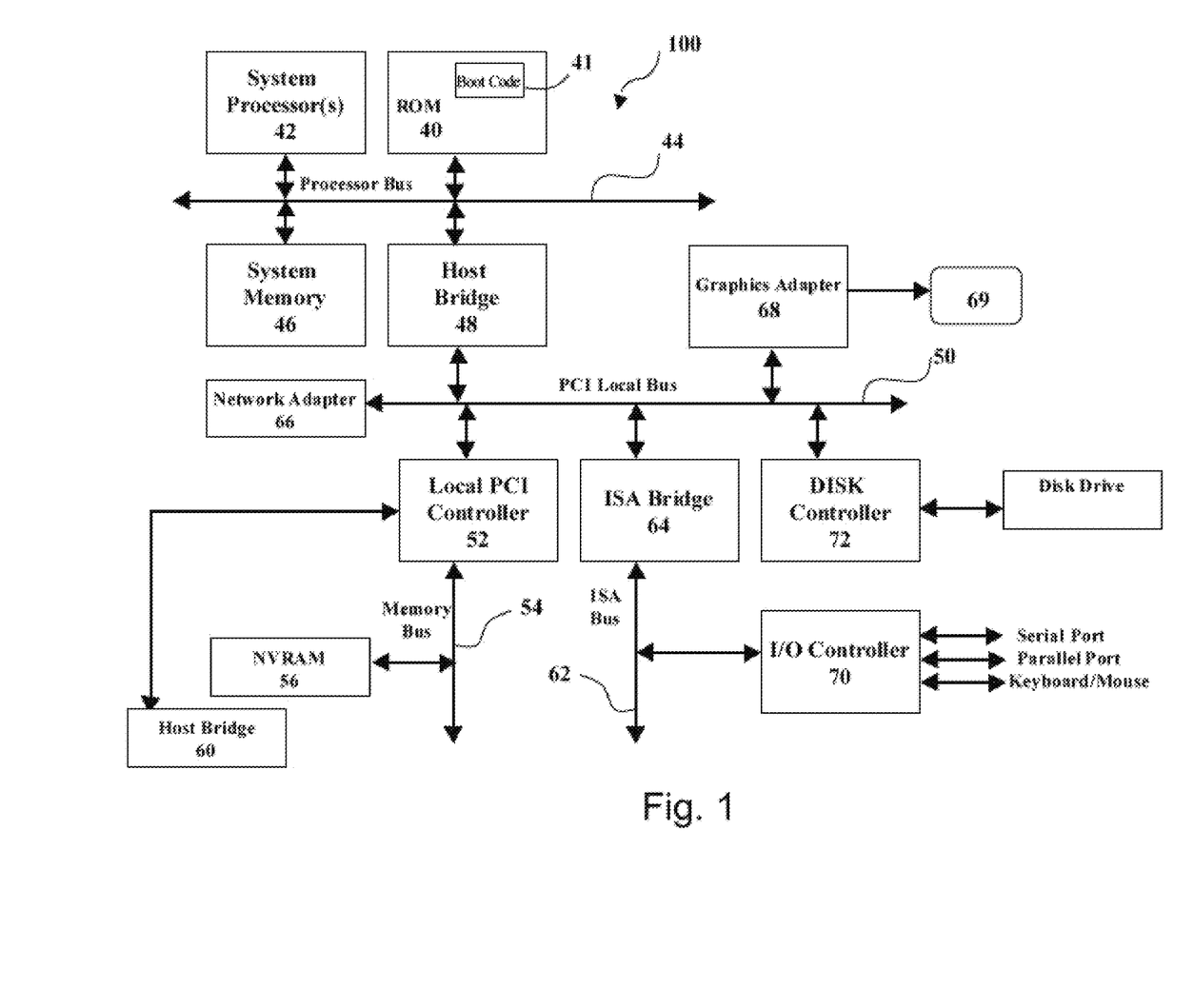
FIG. 1 illustrates a computer system according to an embodiment of the invention.

Referring now to FIG. 1, there is depicted a block diagram of an illustrative embodiment of a computer system 100. The illustrative embodiment depicted in FIG. 1 may be an electronic device such as a desktop computer, workstation computer, laptop computer, mobile computing device, smart phone and the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computes system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

Figure 2:
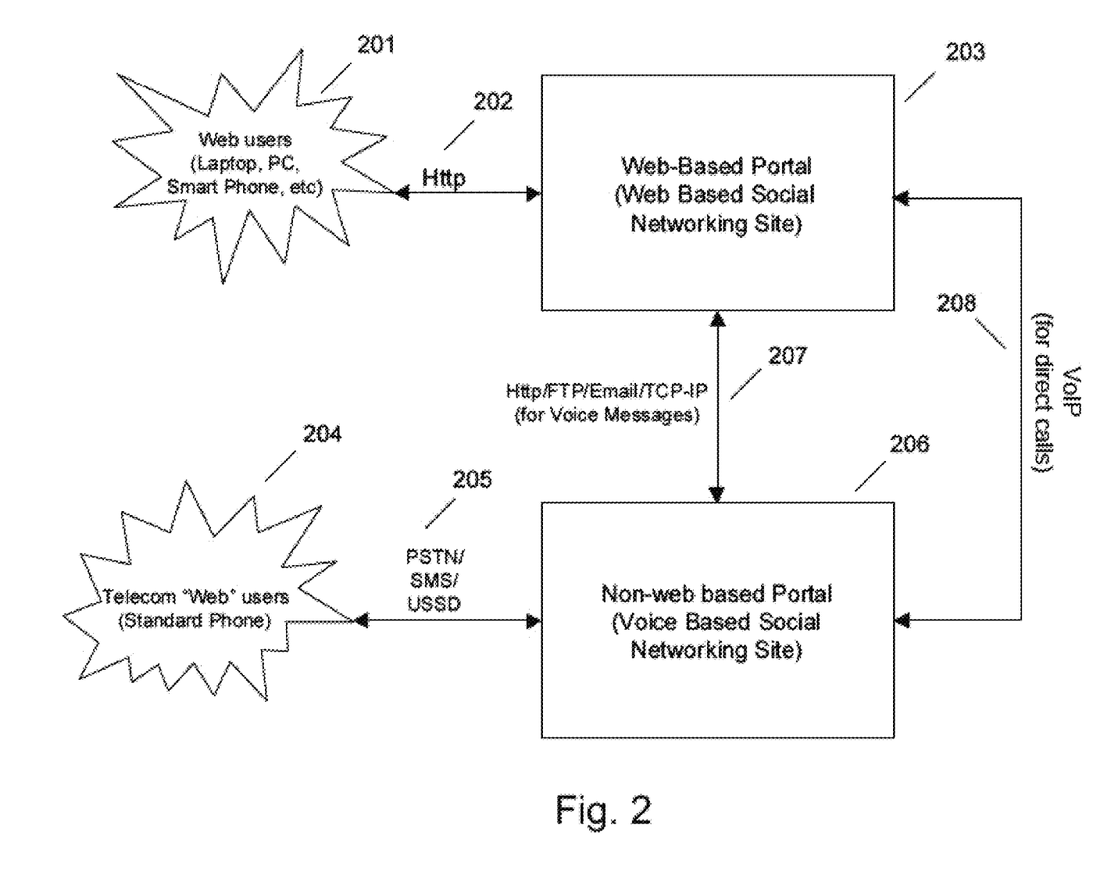
FIG. 2 illustrates a social networking system according to an embodiment of the invention.

FIG. 2 illustrates a social networking system according to an embodiment of the invention. Web users 201 connect (using their web-enabled/Internet, high-end devices (such as laptops, PCs, smart phones and the like)) via a suitable network (Internet) connection 202 with a web-based portal 203 hosting web-based social network sites. In contrast, telecommunication users (referred to herein as telecom users or telecom web users) 204 connect (using their standard, non-web-enabled phones (for example, a landline only phone or simple mobile/cellular phone not having Internet connectivity)) via a suitable connection 205 (for example, Public Switched Telephone Network (PSTN), Short Message Service (SMS), or Unstructured Supplementary Service Data (USSD)) with a non-web based portal 206 including non-web based social networking sites. As discussed herein the non-web based portal includes non-traditional portals and connections including all the different modalities that can be used to access such portals such as SMS, USSD and voice.

According to an exemplary embodiment of the invention, telecom web users 204 can establish a voice site (non-web based social networking site/profile) using the non-web based portal 206. Similar to a web-based social networking site, the voice site can contain telecom web user 204 information including contact information of the telecom web user 204, contact information for friends of the telecom web user 204, and links to other telecom web user 204 voice sites. Moreover, as described herein, the voice site, accessed via the non-web based portal, permits telecom web users 204 convenient access to other portals, including web-based portal 203, hosting web-based social networking sites and other web services.

A non-limiting example consistent with an embodiment of the invention, a voice site includes a voice based profile and messaging system capability, allowing telecom web users 204 to interact using simplified (for example voice based) commands, largely dictated by the simplified user interfaces of their lower end devices (for example, non-web-enabled cell phones). For example, telecom web users 204 can access his or her voice site via telephone call and navigate within the voice site via automated menu selection(s). Telecom web users 204 can establish their voice sites/profiles within the non-web based portal and link to other telecom web users 204 voice sites/profiles.

Notably, as illustrated and according to embodiments of the invention, web users 201 and telecom web users 204 can communicate with one another by accessing separate portals 203 and 206 which are linked together via one or more suitable connections 207, 208. In and among other aspects of the invention, such a cross networking capability will enable telecom web users 204, that may not have access to the Internet and/or high-end mobile devices, the ability to leverage the features available to the web users 201 and their associated web-based social networking sites 203.

According to an exemplary embodiment of the invention, users (201, 204) can utilize real-time communication, for example by employing the Voice over Internet Protocol (VoIP) to place calls to one another. Moreover, according to an exemplary embodiment of the invention, the users 201 and 204 can communicate asymmetrically via passing voice and/or text-based messages between portals using an appropriate communication protocol 207, such as HTTP, FTP, Email, or TC-IP. Such cross networking does not require telecom web users 204 to establish web-based social networking profiles; thus, telecom web users 204 need not expend resources unnecessarily to obtain higher end devices and/or obtain Internet connections.

Figure 3:
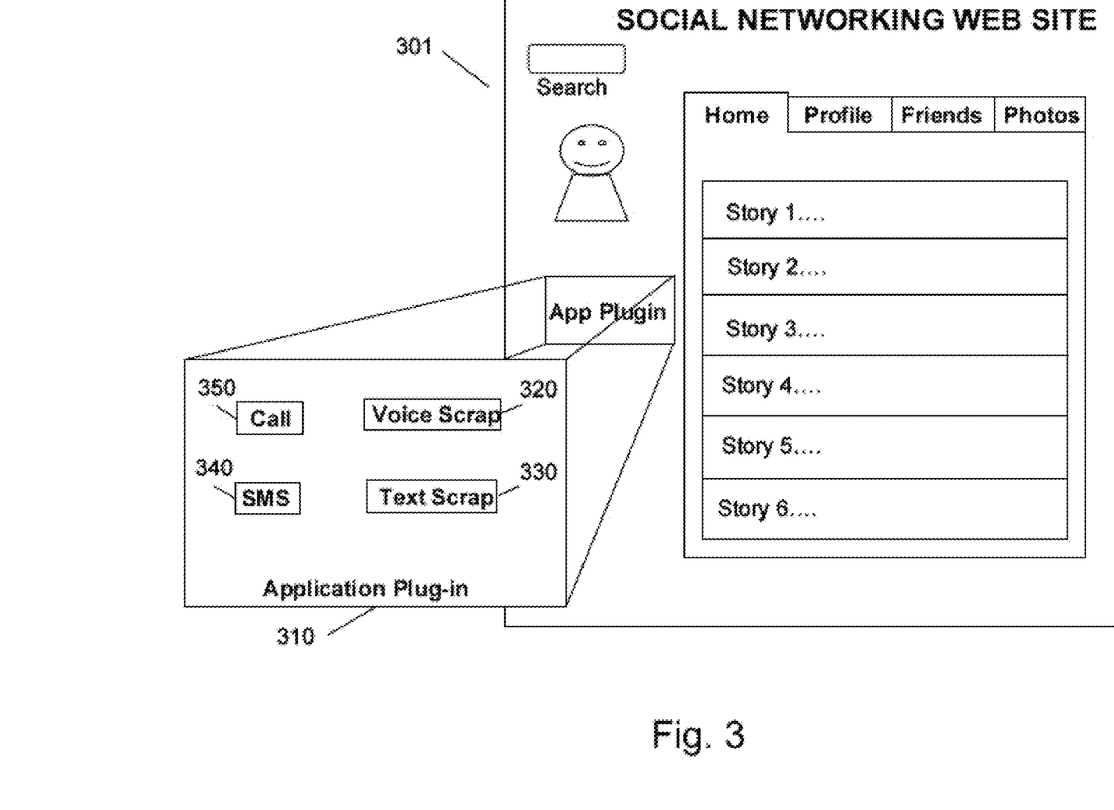
FIG. 3 illustrates a web-based networking web site according to an embodiment of the invention.

From a web user's 201 perspective, a web-based social networking site (such as described in connection with FIG. 3 herein) provides an additional application plug-in (310, FIG. 3). This provides the web-based users 201 with a convenient interface for creating contacts with the non-web based portal 206 telecom web users 204. From the telecom web users' 204 perspective, the non-web based portal essentially mimics the application plug-in (310, FIG. 3) functionality using simple menu commands. According to an exemplary embodiment of the invention, calls and SMS messages can be passed/forwarded to the users' (201, 204) devices whereas non-web based messages and text-based messages between users (201, 204) are transmitted to and stored by the non-web based portal 206 for retrieval by the users (201, 204), as described herein.

FIG. 3 illustrates a social networking web site 301 of the web-based portal 203 according to an embodiment of the invention. As illustrated, the social networking web site 301 includes an application plug-in 310 that enables web-based social networking users (web users 201) to communicate with other users (other web based users 201 and/or telecom web users 204) using a non-web based modality. For example, web users 201 can send voice messages (or place calls) to one another by clicking on the voice scrap 320 (or call 350) icon within the application plug-in 310. In response to a web user 201 clicking on (or otherwise selecting) the voice scrap 320 icon, the web user 201 can enter contact information for the other web user (for example social networking profile identification (ID) or telephone number or the like), or select from a predetermined set of contacts ("friends"), to which the voice message (or call) will be sent. The application plug-in 310 in combination with appropriate hardware (voice input device) and software (voice recording/transmitting software and the like) enable the web user 201 to record and send the voice message to other web user. In the case of a voice message (referred to herein as "voice scrap"), the web user to which the voice message is sent receives a notification of the new voice message, which can be retrieved by clicking on the notification.

According to an exemplary embodiment of the invention, web users 201 can communicate with telecom web users 204 by selecting one or more of voice scrap 320, a text scrap 330, SMS 340 or call 350 options provided by the application plug-in 310 user interface.

A text scrap is different from text SMS in terms of the delivery mechanism, that is web-based as opposed to telecommunication driven, respectively. These also differ in terms of size limit (1024 chars in text scrap as supported by popular social networking sites). When a web user submits a text scrap through the plug-in (of the non-web based social networking site) available in the web based social networking site, the text scrap is collected by the non-web based portal and delivered to its addressed user through a predetermined channel. If the user had chosen delivery through SMS it would be converted to one or more SMSs and delivered. If USSD was the option then the user would get the scrap next time he or she logs in through a USSD based application on his or her client device. And if voice channel is the preferred mode then text scrap is converted to speech and played to the user either over an outbound phone call or when the user logs in next to the voice portal.

Similarly, if a web based social networking site receives a scrap either through SMS or a USSD application, the scrap in text form is delivered to the addressed web-user through the web-based social networking site's exposed APIs. In the voice case, there are for example two options. Based upon specified settings, either speech to text conversion first takes place and then the text scrap gets delivered as above or voice fragment is stored and delivered as a voice scrap.

In the context of FIG. 3, SMS and Call are two options provided to allow direct one to one interaction between the two friends connected with each other. Whereas the scraps (text or voice) are being maintained by the social networking sites and could possibly be available to other friends connected to these two interacting people.

As a non-limiting example consistent with embodiments of the invention, web users 201 can send a short voice message to telecom users 204 by selecting the voice scrap option 320 available in the application plug-in 310. As discussed herein, the application plug-in 310 provides an option to enter the necessary contact information to allow the web-based user 210 to indicate the telecom users 204 to which the voice message is to be sent.

After recording the voice message, the application plug-in 310 sends the voice message to the non-web based portal 206 via a suitable connection 207 linking the web-based portal 203 and the non-web based portal 206. The non-web based portal 206 then routes the voice message to the appropriate telecom web users' 204 profile(s), as indicated by the web user 201 that entered the contact information. As discussed further herein, the telecom web user 204 can retrieve the voice message from a voice mailbox that is included in his or her voice site.

Moreover, according to an exemplary embodiment of the invention, the web users 201 are enabled to send text-based messages (for example SMS messages or text scraps) to the telecom web users 204, even though the telecom web users 204 do not have a web-based profile, utilizing the SMS 340 and/or Text Scrap 330 options available in the application plug-in 310. In response to the web user 201 selecting the SMS 340 option in the application plug-in 310, the web user 201 again is enabled to enter contact information of the telecom user 204 to which the SMS message (or text scrap) is to be sent. Telecom web users' 204 contact information may be imported from the non-web based portal 206 (for example, added to the web users' 201 "friends" list). Furthermore, the web user 201 is given a text box or the like in which to type the short SMS message (or text scrap) utilizing an appropriate input device, such as a keyboard or touch screen interface and the like.

Once the web uses 201 has composed the text-based message, it can be sent by selecting a send option within the application plug-in 310. If a text scrap, the text-based message is sent to the non-web based portal and routed to the appropriate telecom web user 204 profile(s). The text scrap can be transformed to a voice message utilizing a text-to-speech utility, at which point the telecom web users' 204 can retrieve the message from a voice mailbox in response to entering the voice site. If an SMS, according to an exemplary embodiment, the SMS may be automatically forwarded to the telecom web users 204 phone.

Thus, it can be appreciated that embodiments of the invention permit cross-networking communication ability between web users 201 and telecom users 204 via the non-web based portal 206 and the application plug-in 310. As another non-limiting example consistent with embodiments of the invention, web users 201 can call other users, including telecom web users 204, directly, for example utilizing VoIP, by clicking on the call 350 option made available by the application plug-in 310. The application plug-in 310 establishes the VoIP call with the user indicated by the contact information entered by the web user. The VoIP call is established utilizing an appropriate connection either with one or more other web users 201 or with the voice based portal 206 for connecting with one or more telecom web users 204.

Figure 4:
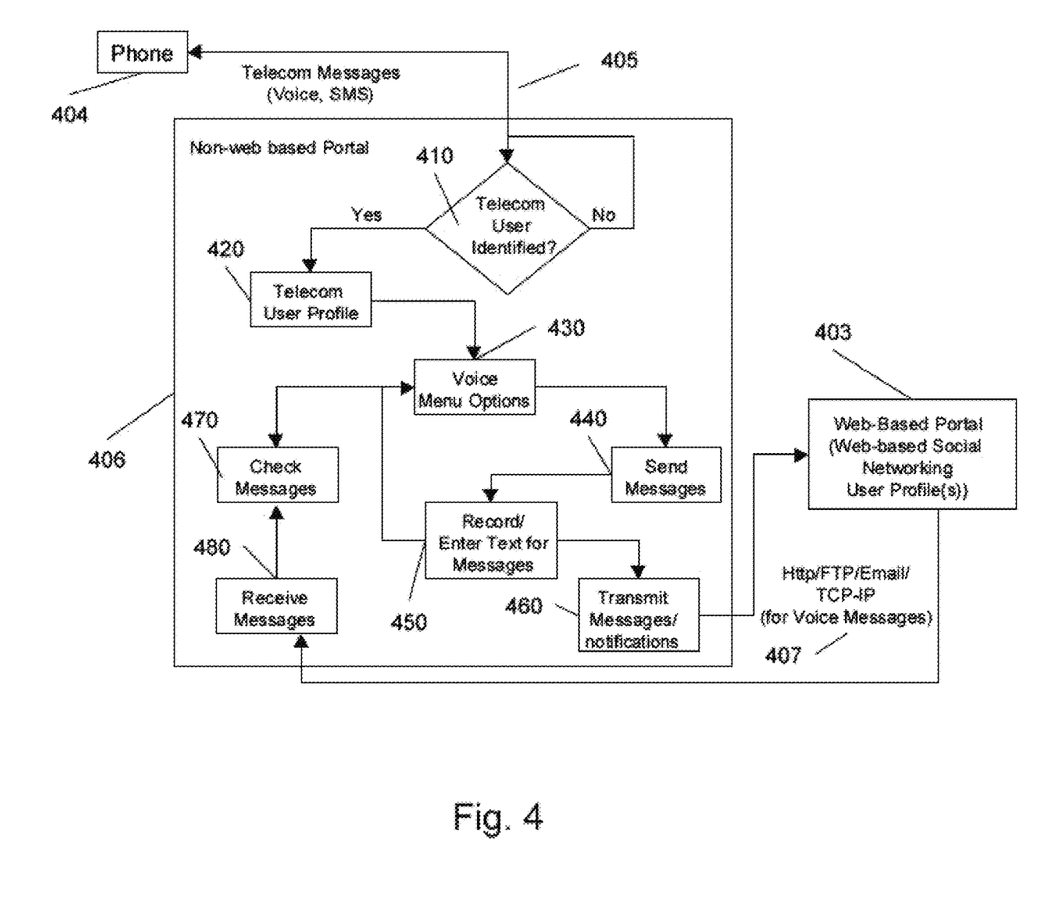
FIG. 4 illustrates a non-web based networking site according to an embodiment of the invention.

Referring now to FIG. 4, a non-web based portal 406 and associated voice site according to an embodiment of the invention is illustrated. As illustrated, telecom users connect with their device (for example, standard, non-web-enabled phone 404) via an appropriate connection 405. The non-web based portal 406 first identifies the telecom user at 410, which may be automated via a device identification or require the telecom user to input an identification/password. If the telecom user is properly identified, the telecom uses is passed to his or her profile at 420. If the identification fails, the identification process could be repeated until correctly completed or end the session after a predetermined number of failed attempts.

Within the non-web based portal 406, the telecom user's profile can offer a myriad of choices, notably according to an embodiment of the invention, the telecom user can select (for example via voice or keypad input or the like) from a predetermined set of voice menu options at 430. Among others, a voice menu option is to send and/or receive (check) a voice or text-based (for example SMS text message) to another user, including a web user via a web-based portal 403.

At 440, if the telecom user chooses to send a message to another user, the telecom user is presented with the option of recording a voice message or entering a text message at 450. Either before or after recording/entering the message, the telecom user is prompted to enter an identification of the user to which the message is to be transmitted. In the case of another telecom web user, the identification could be another telecom web user's profile identification, name or telephone number (which could be provided and stored in a contacts or "friends" list). In the case of a message to a web user, the identification could be a name or profile identification number along with a social network site identification (which could also be provided and stored in a contacts or "friends" list).

Once the message to a web user has been formed, it can be transmitted at 460 to the web-based portal 403 utilizing an appropriate communication means 407, for example HTTP or TCP-IP (Transmission Control Protocol-Internet protocol). For example, a telecom web user may send voice based message (voice scrap) from the non-web based portal 406 to the web-based portal 403 (application plug-in 310), from which the web-based user may access it. According to an exemplary embodiment of the invention, rather than the voice scrap itself being sent, a notification that a voice scrap is available can be sent to the web user, at which point the web user can retrieve it from the non-web based portal (as discussed further herein).

As discussed in connection with an exemplary embodiment herein, text based and non-web based messages (for example, SMS messages and voice messages) can be communicated by users of the web-based portal 403 via an appropriate connection 407, which can be received 480 by the non-web based portal at 406 and placed for example into the voice site voice mailbox, checked periodically by the telecom user at 470. Moreover, such messages (or notifications thereof) could be forwarded directly to the telecom user device 404 in an automated way (for example in the case of SMS messages, not shown).

Figure 5:
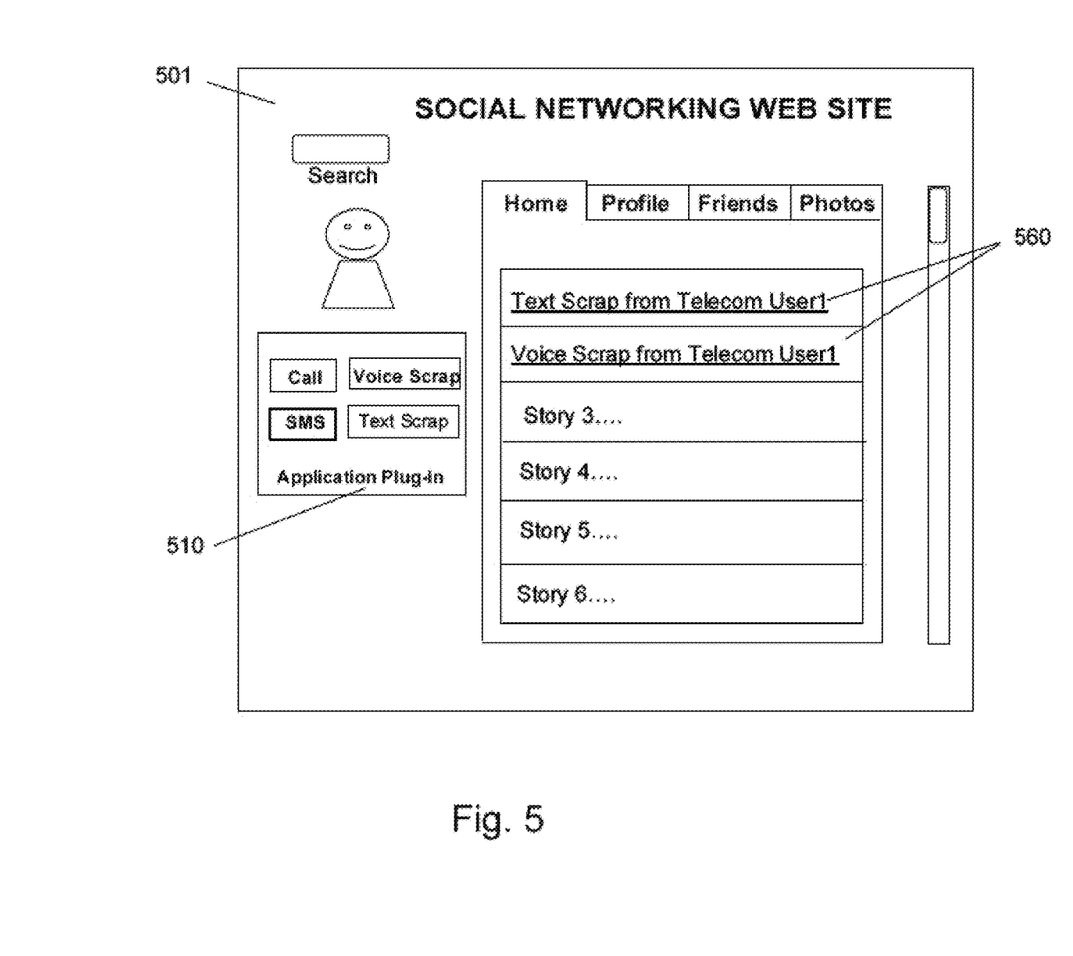
FIG. 5 illustrates a web-based portal according to an embodiment of the invention.

Turning now to FIG. 5, a web-based social networking profile 501 of a web user according to an embodiment of the invention is illustrated. As shown, a telecom user (Telecom User 1 in this example) has transmitted messages (here, a text scrap and a voice scrap) from the non-web based portal (that is, using their voice site/profile, as discussed in connection with FIG. 4) to the web-based portal for delivery to the web user's social networking web-site 501. The web user's application profile plug-in 510 receives the message and generates an indication that it has arrived or is otherwise available, such as appearing in a list of recent changes to the web-based social networking site 501, herein indicated at 560. By clicking on the notifications 560 the web user is enabled to retrieve (for example, linked to) and view/hear the messages from the non-web based portal 403.

Thus, according to embodiments of the invention, the web user's site 501 provides an indication 560 that message(s) have arrived from a telecom web user. In the case of voice scraps (voice based messages), an exemplary embodiment of the invention provides that the web user can click on a linked notification 560 and be directed to the stored message(s), housed for example at the non-web based portal 403. In the case of text scraps, an exemplary embodiment of the invention provides that the text scrap message can be "posted" to (that is, appear directly on) the web user's site 501, for example in the place where the notification would otherwise appear 560. Moreover, in the case of a direct call, an exemplary embodiment provides that a notification of the incoming call be directly presented via the call option of the application plug in 510, such that the telecom uses and the web user can communicate directly in real time. In the case of an SMS message, an exemplary embodiment of the invention provides that the SMS can be forwarded to a mobile device of the web user via the application plug-in 310.

An important functionality of offered by embodiments of the invention include access to the different services that span across the non-web based and web-based social networks. These include for example searching, matchmaking et cetera across connections in the two networks. As an example, a user of non-web based portal seeking a friend with expertise in Java® might submit a query through the non-web based portal and the non-web based site could make use of web based site's APIs to search for his friends matching that criteria but having presence only in the web based site. Naturally, the opposite is also possible.

In brief recapitulation, embodiments of the invention provide a bridge between telecom web users and web-based users, such as social networking site users, such that users of disparate portals can cross network with one another.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programing languages, including an object oriented programming language such as Java, Smalltalk, C++ or the like and conventional procedural programming languages, such as the "C" programming language or similar programming languages. The program code may execute entirely on the user's computer (device), partly on the user's computes, as a stand-alone software package, partly on the user's computer and partly on a remote computes or entirely on the remote computer or serves. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computes, special purpose computer, or other programmable data processing apparatus to produce a machine, such that the instructions, which execute via the processor of the computes or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
one or more hardware processors; and
a non-signal computer readable storage medium having computer readable code embodied therewith and executable by the one or more processors, the computer readable program code comprising:
computer readable program code configured to establish a voice site comprising a non-web based social networking site for access by one or more non-web-enabled telecommunication users using a non-web based portal, wherein the non-web based portal and the voice site are navigated via voice-based commands;
computer readable program code configured to access a web-based social networking site accessed by one or more web-enabled users using a web-based portal, wherein the web-based social networking site comprises a user interface established using an application plug-in within the web-based social networking site; and
computer readable program code configured to permit the one or more telecommunication users of the non-web based portal and the one or more web-based users of the web-based portal to communicate via a non-web based communication channel established between the non-web based portal and the application plug-in within the web-based social networking site, wherein the communication channel permits communication between the users of the non-web based portal and the one or more web-based users using a non-web based communication modality using at least one scrap selected from the group consisting of: a text scrap and a voice scrap;
the text scrap allowing transmission of a text-based communication via the web-based portal based upon a selected delivery mechanism, wherein the text scrap is converted to an SMS upon selection of a SMS delivery mechanism, wherein the text scrap is delivered upon a user logon through a USSD-based application upon selection of a USSD delivery mechanism, and wherein the text scrap is converted to speech and played to a user upon a user logon to a voice portal upon selection of a voice channel delivery mechanism,
the voice scrap allowing transmission of voice messages or phone calls from one of the web-based users to at least one of another user selected from the group consisting of: one of the telecommunications users and another web-based user, wherein in response to selection of the voice scrap the system records and sends a voice message to the another user via a voice message delivery mechanism;
wherein to communicate via the non-web based portal comprises collecting the scrap at the non-web based portal and converting the scrap to a communication modality corresponding to the selected delivery mechanism and delivering via the user interface, the converted scrap via the selected delivery mechanism and transmitting a notification of the communication message via the non-web based portal for access by a predetermined telecommunication user.

2. The apparatus according to claim 1, wherein the non-web based connection comprises one or more connections based on a Public Switched Telephone Network, a Short Message Service, or Unstructured Supplementary Service Data.

3. The apparatus according to claim 1, wherein to place the non-web based portal in operative communication with one or more web-based portals having one or more web sites further comprises to provide one or more communication links according to one or more of hyper text transfer protocol, transmission control protocol and file transfer protocol.

4. A method comprising:
utilizing at least one processor to execute computer code that performs the steps of:
establishing a voice site comprising a non-web based social networking site for access by one or more non-web-enabled telecommunication users using a non-web based portal, wherein the non-web based portal and the voice site are navigated via voice-based commands;
accessing a web-based social networking site accessed by one or more web-enabled users using a web-based portal, wherein the web-based social networking site comprises a user interface established using an application plug-in within the web-based social networking site; and
permitting the one or more telecommunication users of the non-web based portal and the one or more web-based users of the web-based portal to communicate via a communication channel established between the non-web based portal and the application plug-in within the web-based social networking site, wherein the communication channel permits communication between the users of the non-web based portal and the one or more web-based users using a non-web based communication modality using at least one scrap selected from the group consisting of: a text scrap and a voice scrap;
the text scrap allowing transmission of a text-based communication via the web-based portal based upon a selected delivery mechanism, wherein the text scrap is converted to an SMS upon selection of a SMS delivery mechanism, wherein the text scrap is delivered upon a user logon through a USSD-based application upon selection of a USSD delivery mechanism, and wherein the text scrap is converted to speech and played to a user upon a user logon to a voice portal upon selection of a voice channel delivery mechanism,
the voice scrap allowing transmission of voice messages or phone calls from one of the web-based users to at least one of another user selected from the group consisting of: one of the telecommunications users and another web-based user, wherein in response to selection of the voice scrap the system records and sends a voice message to the another user via a voice message delivery mechanism;
wherein to communicate via the non-web based portal comprises collecting the scrap at the non-web based portal and converting the scrap to a communication modality corresponding to the selected delivery mechanism and delivering via the user interface, the converted scrap via the selected delivery mechanism and transmitting a notification of the communication message via the non-web based portal for access by a predetermined telecommunication user.

5. The method according to claim 4, wherein the non-web based connection comprises one or more connections based on a Public Switched Telephone Network, a Short Message Service, or Unstructured Supplementary Service Data.

6. The method according to claim 4, wherein to place the non-web based portal in operative communication with one or more web-based portals having one or more web sites further comprises to provide one or more communication links according to one or more of hyper text transfer protocol, transmission control protocol and file transfer protocol.

7. A computer program product comprising:
one or more hardware processors; and
a non-signal computer readable storage medium having computer readable code embodied therewith and executable by the one or more processors, the computer readable program code comprising:
computer readable program code configured to establish a voice site comprising a non-web based social networking site for access by one or more non-web-enabled telecommunication users using a non-web based portal, wherein the non-web based portal and the voice site are navigated via voice-based commands;
computer readable program code configured to access a web-based social networking site accessed by one or more web-enabled users using a web-based portal, wherein the web-based social networking site comprises a user interface established using an application plug-in within the web-based social networking site; and
computer readable program code configured to permit the one or more telecommunication users of the non-web based portal and the one or more web-based users of the web-based portal to communicate via a communication channel established between the non-web based portal and the application plug-in within the web-based social networking site, wherein the communication channel permits communication between the users of the non-web based portal and the one or more web-based users using a non-web based communication modality using at least one scrap selected from the group consisting of: a text scrap and a voice;
the text scrap allowing transmission of a text-based communication via the web-based portal based upon a selected delivery mechanism, wherein the text scrap is converted to an SMS upon selection of a SMS delivery mechanism, wherein the text scrap is delivered upon a user logon through a USSD-based application upon selection of a USSD delivery mechanism, and wherein the text scrap is converted to speech and played to a user upon a user logon to a voice portal upon selection of a voice channel delivery mechanism,
the voice scrap allowing transmission of voice messages or phone calls from one of the web-based users to at least one of another user selected from the group consisting of: one of the telecommunications users and another web-based user, wherein in response to selection of the voice scrap the system records and sends a voice message to the another user via a voice message delivery mechanism;
wherein to communicate via the non-web based portal comprises collecting the scrap at the non-web based portal and converting the scrap to a communication modality corresponding to the selected delivery mechanism and delivering via the user interface, the converted scrap via the selected delivery mechanism and transmitting a notification of the communication message via the non-web based portal for access by a predetermined telecommunication user.

8. The computer program product according to claim 7, wherein the non-web based connection comprises one or more connections based on a Public Switched Telephone Network, a Short Message Service, or Unstructured Supplementary Service Data.

9. The computer program product according to claim 7, wherein the non-web based portal having one or more voice sites is configured to provide the one or more telecommunication users access to one or more services that span across the non-web based portal and web-based portal, the one or more services including one or more of searching and matchmaking across one or more connections between the non-web based portal and the web based portal.

10. An apparatus comprising:
one or more hardware processors; and
a non-signal computer readable storage medium having computer readable code embodied therewith and executable by the one or more processors, the computer readable program code comprising:
computer readable program code configured to place a web-based portal in operative communication with a non-web based portal having one or more voice sites, wherein the non-web based portal and one or more voice sites are navigated via voice-based commands by establishing an interface application plug-in at the web-based portal;
wherein the one or more voice sites comprise one or more non-web based social networking profiles established via the non-web based portal and accessed by one or more non-web-enabled telecommunications users using the non-web based portal; and
computer readable program code configured to permit one or more web users of the web portal to communicate with telecommunication users associated with the one or more voice sites via a communication channel established between the non-web based portal and the interface application plug-in of the web-based portal, wherein the communication channel permits communication between users of the non-web based portal and users of the web-based portal using a non-web based communication modality using at least one scrap selected from the group consisting of: a text scrap and a voice scrap;
the text scrap allowing transmission of a text-based communication via the web-based portal based upon a selected delivery mechanism, wherein the text scrap is converted to an SMS upon selection of a SMS delivery mechanism, wherein the text scrap is delivered upon a user logon through a USSD-based application upon selection of a USSD delivery mechanism, and wherein the text scrap is converted to speech and played to a user upon a user logon to a voice portal upon selection of a voice channel delivery mechanism,
the voice scrap allowing transmission of voice messages or phone calls from one of the web-based users to at least one of another user selected from the group consisting of: one of the telecommunications users and another web-based user, wherein in response to selection of the voice scrap the system records and sends a voice message to the another user via a voice message delivery mechanism and wherein:
the one or more voice sites comprise one or more non-web based social networking profiles;
the web portal comprises one or more social networking sites; and
to communicate, from the web portal via the interface application plug-in, with telecommunication users associated with the one or more voice sites via the non-web based portal further comprises to transmit the scrap to the non-web based portal on the one or more voice sites by collecting the scrap at the non-web based portal and converting the scrap to a communication modality corresponding to the selected delivery mechanism and delivering the converted scrap via the selected delivery mechanism.

11. The apparatus according to claim 10, wherein the computer readable program code further comprises:
computer readable program code configured to permit the one or more web users of the web portal to place a voice over Internet protocol call to the one or more telecommunication users associated with the one or more voice sites; and
computer readable program code configured to enable the one or more web users to pass short voice messages to one another via the web portal.

12. A computer program product comprising:
a non-signal computer readable storage medium having computer readable program code embodied therewith, the computer readable program code comprising:
computer readable program code configured to provide a non-web based portal hosting a plurality of non-web based social networking sites associated with a plurality of non-web enabled telecommunication users;
wherein the plurality of non-web based social networking sites are configured to be navigable by the plurality of telecommunication users with non-web-enabled telephones;
wherein the non-web based social networking sites are navigated via voice-based commands;
wherein the one or more voice sites comprise one or more non-web based social networking profiles established via the non-web based portal;
computer readable program code configured to provide one or more communication links between the non-web based portal and a web portal accessed by a plurality of web-enabled users via an application plug-in within the web portal, wherein the communication links permits communication between the users of the non-web based portal and the one or more web-based users using a non-web based communication modality using at least one scrap selected from the group consisting of: a text scrap and a voice scrap;
the text scrap allowing transmission of a text-based communication via the web-based portal based upon a selected delivery mechanism, wherein the text scrap is converted to an SMS upon selection of a SMS delivery mechanism, wherein the text scrap is delivered upon a user logon through a USSD-based application upon selection of a USSD delivery mechanism, and wherein the text scrap is converted to speech and played to a user upon a user logon to a voice portal upon selection of a voice channel delivery mechanism,
the voice scrap allowing transmission of voice messages or phone calls from one of the web-based users to at least one of another user selected from the group consisting of: one of the telecommunications users and another web-based user, wherein in response to selection of the voice scrap the system records and sends a voice message to the another user via a voice message delivery mechanism; and
computer readable program code configured to pass communications between the plurality of telecommunication users and the plurality of web users utilizing the one or more communication links wherein to pass communications comprises collecting the scrap at the non-web based portal and converting the scrap to a communication modality corresponding to the selected delivery mechanism and delivering via the application, the converted scrap via the selected delivery mechanism, and transmitting a notification of the communication message via the non-web based portal for access by a predetermined telecommunication user.

* * * * *